United States Patent [19]

Walker et al.

[11] 4,204,899

[45] May 27, 1980

[54] CORK-RESIN ABLATIVE INSULATION FOR COMPLEX SURFACES AND METHOD FOR APPLYING THE SAME

[75] Inventors: Hill M. Walker, Guntersville; Max H. Sharpe; William G. Simpson, both of Huntsville, all of Ala.

[73] Assignee: The United States of America as represented by the Administrator of the National Aeronautics and Space Administration, Washington, D.C.

[21] Appl. No.: 941,711

[22] Filed: Sep. 12, 1978

[51] Int. Cl.$^2$ .................... B29C 17/00; B29C 17/04
[52] U.S. Cl. .................... 156/212; 156/213; 156/285; 264/118; 264/119; 264/124; 260/17.2
[58] Field of Search .......... 156/212, 213, 285; 264/124, 118, 119; 260/17.5, 9; 428/326, 455, 456

[56] References Cited

U.S. PATENT DOCUMENTS

| | | | |
|---|---|---|---|
| 2,671,733 | 3/1954 | Ostermayer | 264/124 X |
| 3,055,057 | 9/1962 | Flotron | 264/124 X |
| 3,284,260 | 11/1966 | Best | 156/212 |
| 3,591,447 | 7/1971 | Juhl | 428/326 |
| 3,784,433 | 1/1974 | Garnish et al. | 156/330 X |
| 3,821,135 | 6/1974 | King | 260/9 |
| 4,053,667 | 11/1977 | Smith | 156/285 X |

*Primary Examiner*—George F. Lesmes
*Assistant Examiner*—Daniel R. Zirker
*Attorney, Agent, or Firm*—J. H. Beumer; J. R. Manning; L. D. Wofford, Jr.

[57] ABSTRACT

Cork-resin ablative insulation material is prepared in a form suitable for application to complex curved surfaces by mixing finely divided cork with a B-stage curable thermosetting resin, forming the resulting mixture into a block, B-stage curing the resin-containing block and slicing the block into sheets. The B-stage cured sheet is shaped to conform to the surface being insulated, and further curing is then performed. Curing of the resin only to B-stage before shaping enables application of sheet material to complex curved surfaces and avoids limitations and disadvantages presented in handling of fully cured sheet material.

3 Claims, No Drawings

CORK-RESIN ABLATIVE INSULATION FOR COMPLEX SURFACES AND METHOD FOR APPLYING THE SAME

ORIGIN OF THE INVENTION

This invention was made by employees of the United States Government and may be manufactured and used by or for the United States Government for governmental purposes without payment of any royalties thereon or therefor.

BACKGROUND OF THE INVENTION

This invention relates to cork compositions and more particularly to cork-resin ablative insulating material and to a method of applying such material to complex curved surfaces.

DESCRIPTION OF THE PRIOR ART

Natural cork has properties that make it an ideal material for providing thermal protection to certain exposed surfaces of rocket booster stages. It has a low density, low thermal conductivity and a high degree of stability in the presence of vibration. Owing to its unique cellular structure, cork burns slowly under ignition, forming successive layers of char. Compositions made up of cork particles and a phenolic resin binder have been shown to be effective ablative insulating materials.

Cork insulating material has been prepared previously by combining cork particles with phenolic resin, curing the mixture by application of heat and pressure and cutting sheets from the resulting fully cured, consolidated block. Fully cured composition cork sheet material can be applied to plane, cylindrical or conical surfaces without difficulty simply by cutting, fitting, and bonding parts in place. In the case of complex curved surfaces, however, application of fully cured sheet material has presented much difficulty. Flexibility of fully cured compositions is limited, and in most cases sheet material breaks or cracks when attempts are made to drape the material to conform to contours of complex surfaces. Even when cured sheet material is bonded to a contoured surface, the composition retains a memory of its flat shape and tends to undergo bridging and formation of residual stresses. As a result, laying up of large numbers of small individual pieces has been required in applying cork composition to complex surfaces. The use of cork as an ablative insulation material would be greatly facilitated by providing cork-resin composition in a form suitable for laying up as sheet material conforming to complex curved surfaces.

SUMMARY OF THE INVENTION

In the present invention cork-resin ablative insulating material is provided in the form of B-stage cured, flexible sheets capable of being applied to complex curved surfaces. The sheet material is prepared by mixing finely divided cork particles with a thermosetting resin amenable to B-stage curing, compressing the mixture into a block, curing the block to B-stage and cutting it into sheets. The resulting cork-resin sheets, while in B-stage condition, are shaped to conform to the surface being insulated and are then subjected to further curing. B-stage curing of the resin-cork composition provides strength for cutting and handling of sheet material, consistent with sufficient flexibility to conform to complex shapes and internal flowability to allow molding into a smooth continuous piece. Problems of cracking or bridging and tedious application of small pieces of fully cured material are thereby avoided. In addition, cork-resin material that is subjected to B-stage curing as an intermediate processing step exhibits properties superior to conventional cork ablative insulation, in particular, lower density and better performance in thermal aero-shear environments.

It is therefore an object of this invention to provide cork-resin ablative insulation material in a form suitable for application to complex curved surfaces.

Another object is to provide cork-resin sheet material capable of being laid up on complex surfaces and cured without undergoing cracking or bridging.

Another object is to provide a method of applying cork-resin ablative insulating material to complex curved surfaces. These and other objects and advantages of the invention will become apparent upon reference to the following detailed description.

DESCRIPTION OF THE PREFERRED EMBODIMENT

Finely divided cork, preferably in the form of granules 16 to 50 Mesh (U.S. Standard) in size, is mixed with a resin system selected to provide capability for B-stage curing, consistent with desired final properties such as strength and temperature stability in the fully cured product. In general a resin content of 20 to 60 weight percent can be used, and 25 to 45 weight percent is preferred. Although other resin systems, such as polyurethanes, silicones, epoxies and melamines can be employed, phenolic resins are preferred because of their favorable high temperature stability, strength and ablation characteristics.

Phenolic resins, which are condensation reaction products of an aldehyde with a phenol, are available with a wide range of curing characteristics depending on molecular structure, catalyst employed and the like. In order to provide suitable B-stage curing for the present invention the selected phenolic resin system should exhibit a relatively low number of reaction sites so as to avoid rapid curing and relatively long molecular chains, which stearically hinder cross-linking reactions. Techniques for tailoring properties of phenolic resin systems by means such as modifying the molecular structure of reactants are well known in the literature. In addition to the aldehyde and phenol reactants, the resin system may contain other components such as catalysts requiring for curing and a suitable organic solvent. Use of pre-mixed phenolic resin system containing 10 to 20 weight percent organic solvent is preferred. B-stage curing of such systems can be carried out by heating the resin at an elevated temperature for a predetermined period.

In a preferred procedure the resin and cork mixture is disposed in a compressible container, the amounts of resin and cork being selected to provide a given density in the B-stage cured block upon being compressed to a predetermined volume. A density of 25 to 35 pounds per cubic foot is preferred. The phenolic resin-cork mixture is then heated to a temperature of 280° to 320° F., and preferably about 300° F. until B-stage curing is complete, a period of about 15 minutes being required. The heating period can be adjusted to provide optimum handling characteristics, that is, maximum strength consistent with retained flexibility and flowability in sheet obtained from the B-stage cured block. Longer heating periods produce more complete curing and higher strength.

Sheets of B-stage and cork-resin material are produced by slicing the block at the desired thickness. Sheets up to 5/8 inch thick can be processed according to the invention. Conventional cutting or slicing devices can be used for this purpose.

The cork-resin sheet can be shaped to conform to the surface and applied to the surface in one-step, by "in-situ" molding or shaped over a mold corresponding in shape to the surface and subsequently applied to the surface. Although some bonding to the surface will occur without use of an adhesive in in-situ molding, it is preferred to use an adhesive such as an epoxy, polyurethane or silicone resin to insure complete bonding of the sheet to the insulated surface. For in-situ molding the sheet is draped over the adhesive coated surface, and the assembly is placed in a vacuum bag. Upon evacuating of the bag, atmospheric pressure forces the B-stage cured sheet to conform to the surface. In most cases the sheet will conform readily to surface curvatures without cutting or trimming, but such measures may be used to remove excess material when required.

The shaped cork-resin material is then subjected to further curing either at ambient or elevated temperature, depending on the final properties desired. Substantially complete curing can be obtained by heating at 280° to 320° F. for 30 to 60 minutes under vacuum. This curing cycle provides maximum strength and resistance to ablation. However, an alternative room-temperature curing cycle provides adequate properties for most applications and avoids the need for heating. In the latter cycle the shaped sheet is merely allowed to stand in air at room temperature for at least 3 days. Room-temperature curing is particularly advantageous in applications where provision of curing heat is impractical owing to component size or other restrictions.

The invention is further illustrated by the following example.

EXAMPLE I

Test articles comprising a ten-inch metal hemisphere having a ¼ inch thick sheet of cork-phenolic resin bonded to the surface of the hemisphere were prepared by the following procedure: Phenolic resin and cork granules at approximately equal parts by weight were combined to form a mixture, and the mixture was formed into a block having a density of 25 pounds per cubic foot. The block was then B-stage cured by heating at 300° F. Sheets ¼ inch in thickness were then cut from the block, and, after application of a silicone adhesive to the hemisphere, sheet material was draped over the surface. A vacuum bag was then placed over the hemisphere and the bag was evacuated, forcing the sheet to conform to the surface. In some cases the shaped sheet was fully cured by heating at 300° F. for ½ hour, while in other cases further curing was carried out by allowing the shaped sheet to stand in air for 3 days. Specimens of the resulting material were tested for mechanical and physical properties, and for ablation characteristics. Flatwise tensile strength values over 100 pounds per square inch were obtained in most cases, as compared to values of about 75 p.s.i. for conventional fully cured cork-resin material. In the case of specimens cured at room temperature, tensile strength values increased 25 percent after standing for 2 weeks. Thermal conductivities for test specimens were approximately the same as for conventional material, and densities were 20 percent lower. Ablation rates in hypervelocity wind tunnel testing were determined to be 20 percent lower than for conventional material.

While a preferred embodiment has been described above, such description is for illustrative purposes only, and it is to be understood that changes and variations may be made without departing from the spirit or scope of the following claims.

What is claimed is:

1. The method of preparing cork-resin ablative insulation material for application to a complex curved substrate comprising:
    (a) mixing finely divided cork with a B-stage curable thermosetting resin, said resin comprising 20 to 60 weight percent of the mixture;
    (b) forming the resulting mixture into a block;
    (c) B-stage curing the resin-containing block by heating at a temperature of 280° F. to 320° F. for a period of at least about 15 minutes;
    (d) cutting the B-stage cured block into sheets;
    (e) draping the resultant sheet material over said substrate or a surface corresponding in shape thereto;
    (f) enclosing the resulting assembly in a vacuum bag;
    (g) evacuating said bag; and
    (h) further curing the resultant shaped sheet material by heating said sheet material at a temperature of 280° F. to 320° F. for at least 30 minutes.

2. The method of claim 1 wherein said resin is a phenolic resin.

3. The method of preparing cork resin ablative insulation material for application to a complex curved substrate comprising:
    (a) mixing finely divided cork with a B-stage curable thermosetting resin, said resin comprising 20 to 60 weight percent of the mixture;
    (b) forming the resulting mixture into a block;
    (c) B-stage curing the resin-containing block by heating at a temperature of 280° F. to 320° F. for a period of at least 15 minutes;
    (d) cutting the B-stage cured block into sheets;
    (e) draping the resultant sheet material over said substrate or a surface corresponding in shape thereto;
    (f) enclosing the resulting assembly in a vacuum bag;
    (g) evacuating said bag; and
    (h) further curing the resultant shaped sheet material by allowing it to stand in air at ambient temperature for at least three days.

* * * * *